(12) United States Patent
Tjøntveit et al.

(10) Patent No.: US 12,261,895 B2
(45) Date of Patent: Mar. 25, 2025

(54) DISTANCE-BASED FRAMING FOR AN ONLINE CONFERENCE SESSION

(71) Applicant: Cisco Technology, Inc., San Jose, CA (US)

(72) Inventors: Frode Tjøntveit, Fjellhamar (NO); Erik Hellerud, Oslo (NO); Øystein Damhaug, Jessheim (NO); Kristian Tangeland, Oslo (NO)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/083,068

(22) Filed: Dec. 16, 2022

(65) Prior Publication Data

US 2023/0119874 A1  Apr. 20, 2023

Related U.S. Application Data

(63) Continuation of application No. 16/993,955, filed on Aug. 14, 2020, now Pat. No. 11,563,783.

(51) Int. Cl.
*H04L 65/403* (2022.01)
*H04L 12/18* (2006.01)
*H04L 65/60* (2022.01)
*H04L 65/61* (2022.01)

(52) U.S. Cl.
CPC ........ *H04L 65/403* (2013.01); *H04L 12/1813* (2013.01); *H04L 65/60* (2013.01); *H04L 65/61* (2022.05)

(58) Field of Classification Search
None
See application file for complete search history.

(56) References Cited

U.S. PATENT DOCUMENTS

| | | | |
|---|---|---|---|
| 8,228,954 B2 * | 7/2012 | Thubert | H04W 40/246 370/408 |
| 8,754,925 B2 * | 6/2014 | Ng | H04N 7/142 348/14.05 |
| 9,307,200 B2 | 4/2016 | Aarrestad et al. | |
| 9,633,270 B1 * | 4/2017 | Tangeland | H04N 7/15 |
| 9,712,783 B2 | 7/2017 | Aarrestad et al. | |
| 9,800,931 B1 * | 10/2017 | Tangeland | H04N 21/4312 |
| 9,860,517 B1 * | 1/2018 | Ramaswamy | G06T 7/593 |

(Continued)

FOREIGN PATENT DOCUMENTS

JP  2013525787 A  *  6/2013
WO  WO-9960788 A1 * 11/1999 ........... G01S 3/7865

*Primary Examiner* — Lance Leonard Barry
(74) *Attorney, Agent, or Firm* — Edell, Shapiro & Finnan, LLC

(57) ABSTRACT

Distance-based framing includes obtaining at least a video stream during an online conference session. The video stream, an audio stream received with the video stream, or both the video stream and the audio stream are analyzed and a framing that either focuses on a speaker in the video stream or provides an overview of participants in the video stream, the framing being is composed based on the analyzing. A potential error in the framing is detected based on further analysis of the video stream, the audio stream, and an amount of motion in the room. If the distance sensor data contradicts the potential error, the framing is maintained, but if the distance sensor data confirms the potential error, a new framing is generated.

20 Claims, 7 Drawing Sheets

(56) References Cited

U.S. PATENT DOCUMENTS

| | | | |
|---|---|---|---|
| 9,942,517 B1 | 4/2018 | Cassini et al. | |
| 9,942,518 B1* | 4/2018 | Tangeland | G06V 10/763 |
| 10,397,519 B1 | 8/2019 | Kurisaki-Sagberg et al. | |
| 10,401,490 B2 | 9/2019 | Gillian et al. | |
| 2002/0101505 A1* | 8/2002 | Gutta | H04N 7/15 |
| | | | 348/E7.083 |
| 2006/0023915 A1* | 2/2006 | Aalbu | G01S 13/04 |
| | | | 382/103 |
| 2013/0154930 A1* | 6/2013 | Xiang | G06F 3/167 |
| | | | 345/158 |
| 2014/0049595 A1* | 2/2014 | Feng | H04N 7/15 |
| | | | 348/E7.083 |
| 2014/0278399 A1* | 9/2014 | Rodman | H04M 3/568 |
| | | | 704/233 |
| 2015/0146078 A1* | 5/2015 | Aarrestad | H04N 23/635 |
| | | | 348/345 |
| 2017/0099462 A1* | 4/2017 | Tangeland | H04N 7/147 |
| 2019/0228269 A1* | 7/2019 | Brent | G06V 10/82 |
| 2019/0356883 A1 | 11/2019 | Theien et al. | |
| 2020/0117267 A1* | 4/2020 | Gibson | G06F 3/011 |
| 2023/0119874 A1* | 4/2023 | Tjøntveit | H04L 65/61 |
| | | | 709/204 |

\* cited by examiner

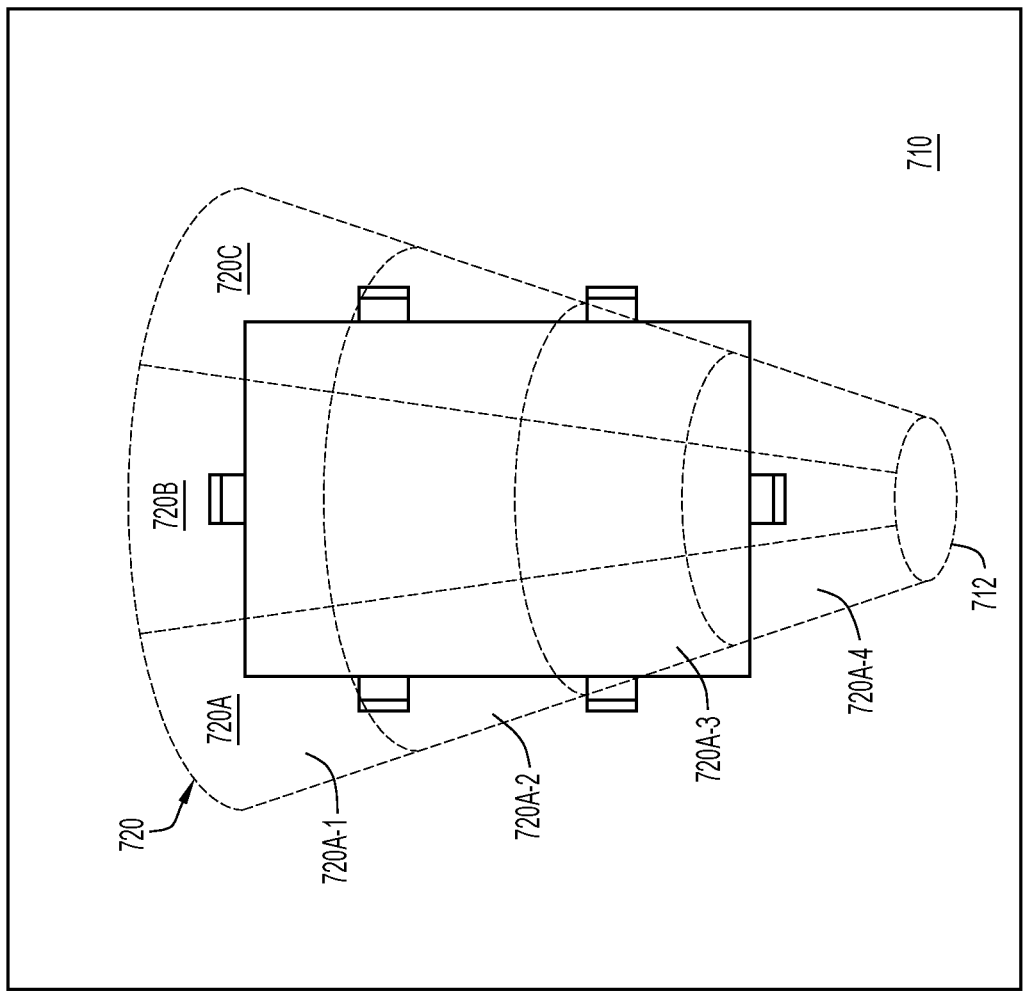

DISTANCE-BASED FRAMING FOR AN ONLINE CONFERENCE SESSION

CROSS REFERENCE TO RELATED APPLICATION

This application is a continuation of U.S. application Ser. No. 16/993,955, filed Aug. 14, 2020, the entirety of which incorporated herein by reference.

TECHNICAL FIELD

The present disclosure relates to collaboration systems and, more particularly, to online conference systems.

BACKGROUND

Online conference systems, sometimes referred to as videoconference, teleconference, telepresence, or collaboration systems, allow meetings between persons or groups of people at different locations. Online conference systems may include equipment configured to allow the persons or groups of people to communicate by at least simultaneous two-way video and/or audio transmissions. Additionally, online conference systems may allow participants in a session (i.e., a meeting) to converse via audio and/or video transmissions while sharing content, such as content shown locally on an endpoint (e.g., on a computer screen), writing or drawing on an electronic whiteboard, and/or other such materials.

Certain online conference systems include endpoints that are equipped with one or more cameras and displays that are configured to capture and present one or more video streams. Some endpoints may also track various participants, such as talking participants, and follow the tracked participants with a camera. Additionally or alternatively, video streams may be processed to compose different framings, such as a speaker framing and an overview framing, which can be utilized during different portions of a meeting. The video streams can be classified as participant streams (e.g., video captured by cameras and containing views of meeting participants) or data content streams (e.g., whiteboard content).

BRIEF DESCRIPTION OF THE DRAWINGS

FIG. 7 is a diagram illustrating an example motion detection plot that can be utilized to analyze distance sensor data, according to an example embodiment

DESCRIPTION OF EXAMPLE EMBODIMENTS

Overview

Figure 1:
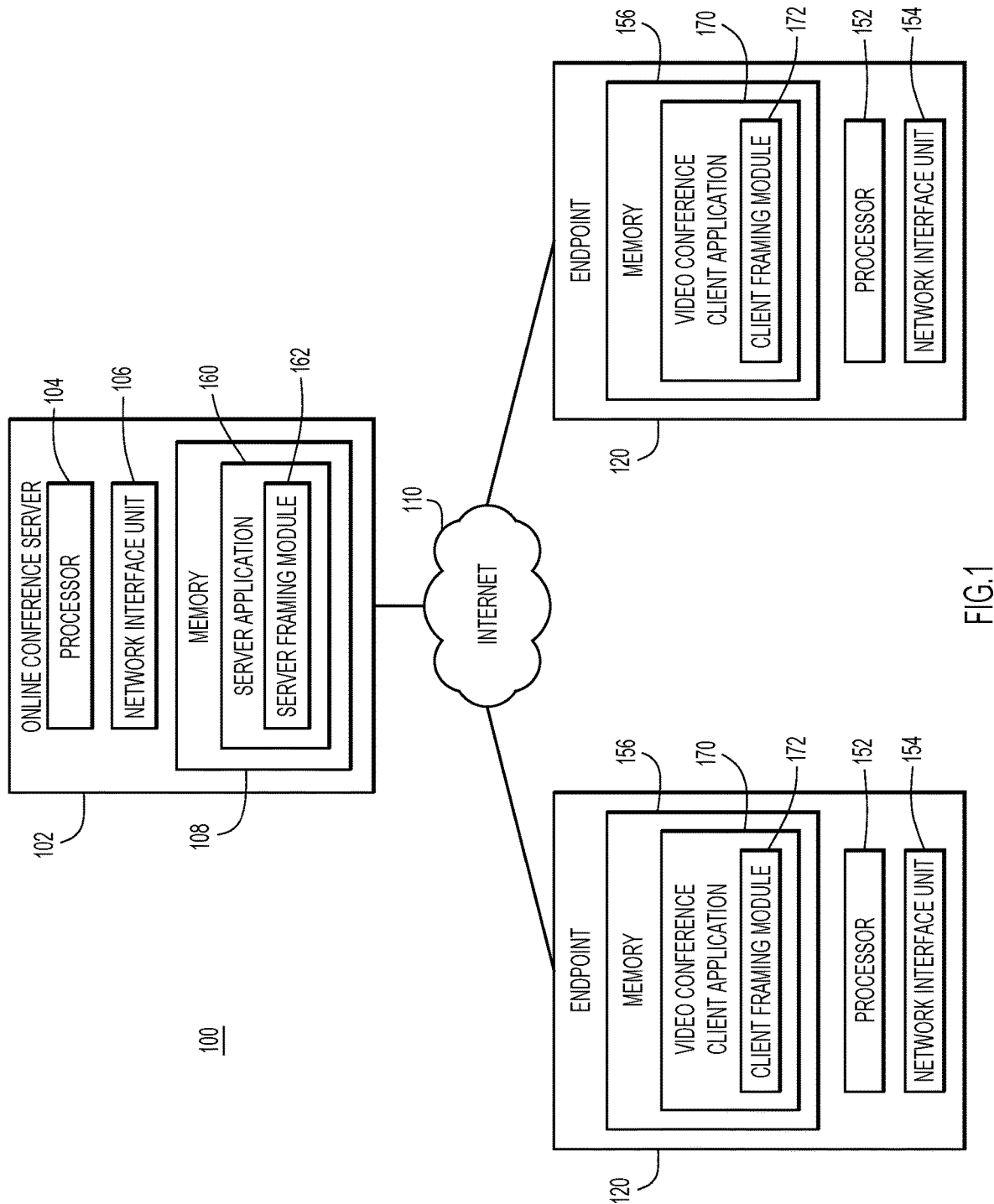
FIG. 1 is a block diagram of an online conference environment in which the distance-based framing techniques presented herein may be utilized, according to an example embodiment.

Techniques are provided herein for framing video during an online conference session based on distance data. These techniques may be embodied as a method, an apparatus, a system, and instructions in a computer-readable storage media to perform the method.

According to at least one example embodiment, the techniques include obtaining at least a video stream during an online conference session. The video stream, an audio stream received with the video stream, or both the video stream and the audio stream are analyzed and a framing that either focuses on a speaker in the video stream or provides an overview of participants in the video stream, the framing being is composed based on the analyzing. A potential error in the framing is detected based on further analysis of at least one of the video stream, the audio stream, or distance sensor data received with the video stream. If the distance sensor data contradicts the potential error, the framing is maintained, but if the distance sensor data confirms the potential error, a new framing is generated.

EXAMPLE EMBODIMENTS

The techniques presented herein provide distance-based framing during an online conference session. More specifically, the techniques generate framings for a video stream during an online conference session based, at least in part, on distance sensor data, such as radar data. The techniques may utilize the distance sensor data to attempt to confirm potential errors in current framings (e.g., generated with speaker tracking framing techniques) that are detected based on analyzing video data, audio data, and/or the distance sensor data. For example, distance sensor data may indicate that a current framing has a potential error. Alternatively, if analyses of video data and audio data generate different speaker locations (e.g., analyses produce non-matching results), this may be a potential error. By using distance-based data to confirm or deny potential errors, the techniques presented herein can correct erroneous framing decisions that are sometimes made based on erroneous results from video and/or audio analysis techniques. This may reduce unnecessary framing switches and/or improve the accuracy of framings during an online conference session.

In order to describe the systems, apparatus, and/or techniques presented herein, terms such as "left," "right," "top," "bottom," "front," "rear," "side," "height," "length," "width," "upper," "lower," "interior," "exterior," "inner," "outer," "depth," and the like as may be used. However, it is to be understood that these terms merely describe points of reference and do not limit the present embodiments to any particular orientation or configuration. For example, the terms "right" and "left" may be used to describe certain embodiments presented herein, but it is to be understood that these terms are not intended to limit the systems, apparatus, and/or techniques presented herein to a single orientation. Instead, the systems, apparatus, and/or techniques presented herein, or portions thereof, may be oriented in any a number of orientations. Thus, even if a certain feature is described herein as being oriented on the "right," it may be understood that this feature may be oriented on the "left" when a system or apparatus is in a different orientation (or when a technique is executed with the system or apparatus in a different orientation).

Reference is first made to FIG. 1, which illustrates an online conference/meeting environment 100 in which an online conference session may utilize the distance-based framing techniques presented herein. In the environment 100, an online conference server 102 (i.e., meeting server 102) communicates, via the Internet 110, with a plurality of endpoints 120. For simplicity, only two endpoints 120 are shown in FIG. 1; however, in other embodiments, the plurality of endpoints 120 may include any number of endpoints/computing devices.

The online conference server 102 includes at least one processor 104, a network interface unit 106, and a memory 108. The processor 104 is configured to execute instructions stored on memory 108 and the network interface unit 106 enables connectivity to the Internet 110. The online conference server 102 also includes a server application 160 that may reside in memory 108 and serves conference session support for online conference client applications 170 (also referred herein as client applications 170, for simplicity) that may be installed on the plurality of endpoints 120 (e.g., downloaded via the Internet 110). Generally, the server application 160 is configured to direct online conference traffic flows between any online conference client applications 170 participating in an online conference session. Thus, once an online conference session is initiated, each client application 170 is operatively connected to the server application 160 such that any client applications 170 connected to the session are in communication with each other in an online conference session via the server application 160. The session may be established using any suitable protocols now known or developed hereafter.

The server application 160 may include a server framing module 162 that is configured to receive and process video captured at any of the endpoints 120 (e.g., via one or more camera at each endpoint 120). For example, the server framing module 162 may process the video from an endpoint to analyze or generate one or more framings for the online conference session based on distance sensor data gathered at that endpoint. Additionally, the server framing module 162 may receive and process data from a variety of sensors, including image sensors (e.g., cameras or lenses), audio sensors (e.g., microphones), and distance sensors (e.g., radar sensors). Additionally or alternatively, the distance-based framing techniques presented herein may be executed on one or more of the endpoints 120 participating in a conference session. Thus, in FIG. 1, client framing module 172 is shown in dashed lines within memory 156 of each of the plurality of endpoints 120. To be clear, client framing module 172 may work with or instead of server framing module 162 to execute the techniques presented herein.

Each of the plurality of endpoints 120 includes a processor 152 configured to execute instructions stored in a memory 156 and a network interface unit 154 that provides connectivity to the Internet 110. For example, the processor 152 may be configured to execute instructions to install the client application 170 (and potentially client framing module 172). Generally, each of the plurality of endpoints 120 may be any computing device/endpoint compatible to support the online conference client application 170. For example, one endpoint 120 may be a tablet computer, desktop computer, laptop computer, and another endpoint 120 may be a smartphone, desktop, virtual machine, or any other device, provided that each of the plurality of endpoints includes or is associated with a processor 152 configured to support the online conference client application 170 and network interface unit 154 configured to connect the device to the Internet 110, respectively. Additionally or alternatively, one or more of the endpoints may be embodied entirely as one or more software applications running on a computing device, such as in a cloud or data center environment. Thus, an endpoint may be a physical device or a software process.

Additionally, although each module described herein is shown stored in memory, such as memory 108, each module described herein may be implemented on hardware, or a combination of hardware and software. For example, each module may include and/or initiate execution of an application specific integrated circuit (ASIC), a Field Programmable Gate Array (FPGA), a circuit, a digital logic circuit, an analog circuit, a combination of discrete circuits, gates, or any other type of hardware, or combination thereof. Accordingly, as used herein, execution of a module by a processor can also refer to logic based-processing by the module that is initiated directly or indirectly by the processor to complete a process or obtain a result. Additionally or alternatively, each module can include memory hardware, such as at least a portion of a memory, for example, that includes instructions executable with a processor to implement one or more of the features of the module. When any one of the modules includes instructions stored in memory and executable with the processor, the module may or may not include a processor. In some examples, each module may include only memory storing instructions executable with the processor to implement the features of the corresponding module without the module including any other hardware.

Moreover, memory 108 and/or memory 156 may also be configured to store any video data, audio data, video processing algorithms, audio processing algorithms, thresholds, or other such data related to distance-based framing during an online conference session. Generally, memory 108 and/or memory 156 may include read only memory (ROM), random access memory (RAM), magnetic disk storage media devices, optical storage media devices, flash memory devices, electrical, optical or other physical/tangible (e.g., non-transitory) memory storage devices. Thus, in general, the memory 108 and/or memory 156 may be or include one or more tangible (non-transitory) computer readable storage media (e.g., a memory device) encoded with software comprising computer executable instructions. For example, memory 108 and/or memory 156 may store instructions that may be executed by processor 104 or processor 152, respectively, for performing the distance-based framing techniques described below with reference to the figures. In other words, memory 108 and/or memory 156 may include instructions, that when executed by one or more processors, cause the one or more processors to carry out the operations described below in connection with the figures.

Figure 2:
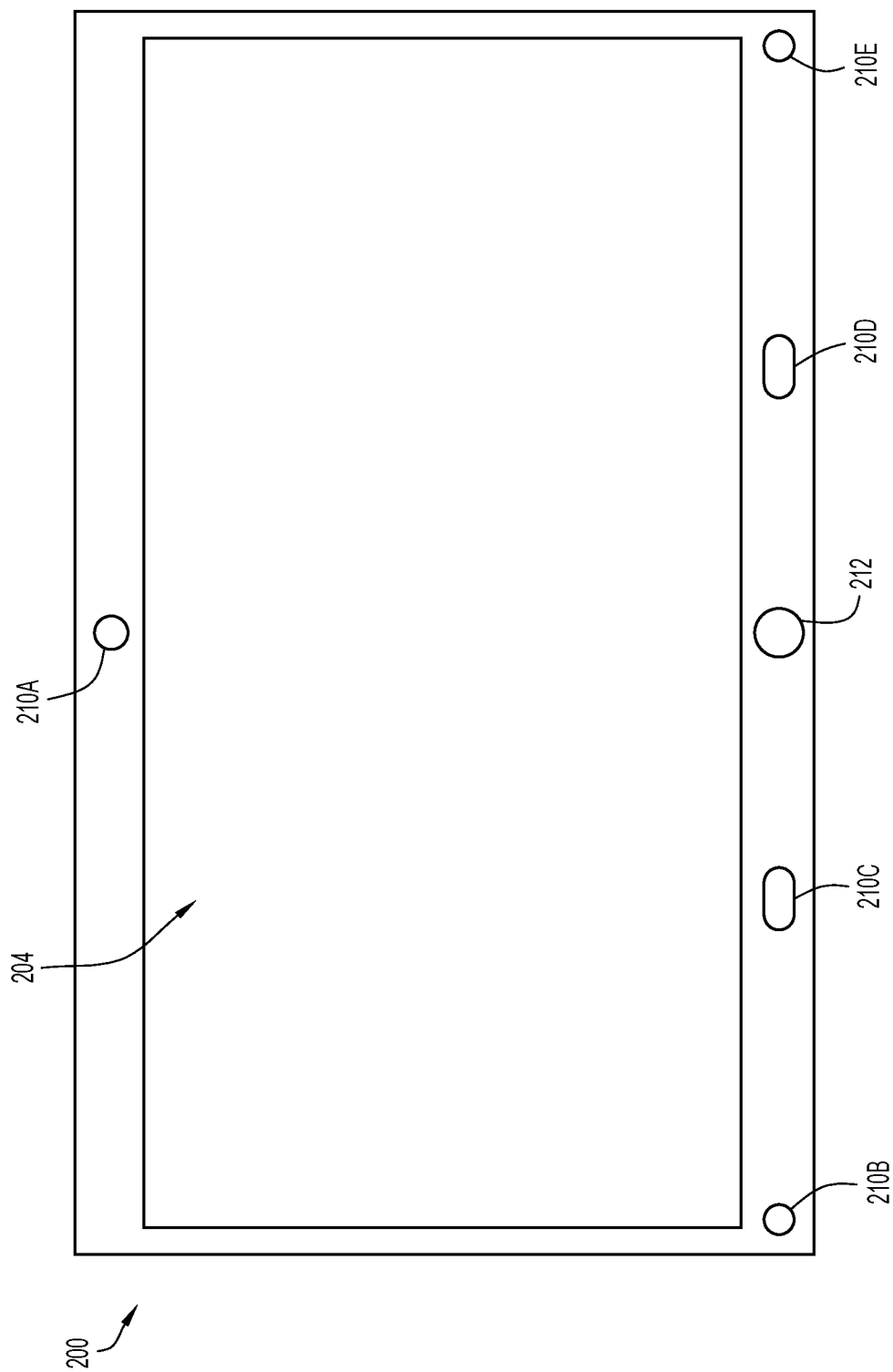
FIG. 2 is a front perspective view of an endpoint that may implement the distance-based framing techniques presented herein, according to an example embodiment.

Reference is now made to FIG. 2, which shows an example embodiment of a video conference endpoint 200 that may execute at least a portion of the techniques presented herein. The video conference endpoint 200 includes a display screen 204, one or more sensors 210A-E, and a distance sensor 212. The display screen 204 may include an electronic whiteboard or other such collaborative display. Additionally, the display screen 204 may be configured to detect writing or drawing on the display screen 204 and/or may include embedded sensors configured to detect writing or drawing on the display screen 204. For example, the display screen 204 may be a touch screen display that detects and records touches. Additionally or alternatively, image analysis may be used to analyze where information is placed on the display screen 204. However, in other embodiments, an apparatus configured to execute at least a portion of the techniques presented herein need not include a display screen 204 and could, for example, be a self-contained apparatus that is attachable to or mountable near a display screen.

Meanwhile, the sensors 210A-E may be any suitable sensors, including microphones, microphone arrays (or portions thereof), image sensors, etc., that are configured to collectively gather audio and video from a space or environment in which the video conference endpoint 200 is disposed. As one example, sensor 210A may be one or more image sensors (e.g., one or more cameras) while sensors 210B, 210C, 210D, and 210E may be microphones that collectively form a microphone array. However, this is only one example and other embodiments may include any arrangement of cameras/image sensors and microphones/audio sensors, or other such equipment, to gather audio and video in the environment. This distance sensor 212 may be any sensor that can detect people or objects in the environment of endpoint 200 and generate distance-based data indicative of motion and/or a location of people or objects in the environment. However, the sensors 210A-E and the distance sensor 212 depicted in FIG. 2 are not intended to be limiting and, the endpoint 200 (or any other apparatus configured to execute at least a portion of the techniques presented herein) may also include any other type of sensor now known or developed hereafter (e.g., in combination with cameras, microphones, and a distance sensor).

In one embodiment, the distance sensor 212 is a radar sensor; however, in other embodiments, the distance sensor 212 could include one or more of a radar sensor, an ultrasound sensor, an infrared sensor, or any other sensor configured to detect locations and/or movements of people and/or objects. When the distance sensor 212 is a radar sensor, the radar sensor may operate at 10 hertz (Hz) to provide five detections per second. Each detection may provide data relating to an angle in a horizontal plane and distance from the distance sensor. These data points can then be plotted onto an angular mapping of an endpoint's environment to track movement and location of participants in the environment, as is described in further detail below in connection with FIG. 7. In at least some embodiments, the detections only detect moving people or objects.

In the depicted embodiment, the image sensor 210A is centered above the display screen 204. Positioning an image sensor centered above the display screen 204 may most effectively capture images of users who are interacting with the endpoint 200 and encourage eye contact between users at different endpoints, at least because content is most frequently displayed or added (e.g., written or drawn) at a top-center portion of the display screen 204. Meanwhile, microphones 210B-E and distance sensor 212 may be disposed below or around the display screen 204 to provide wide coverage and allow for efficient speaker tracking and movement detection, respectively. However, as mentioned, this is only an example, and in other embodiments, sensors 210A-E and the distance sensor 212 could be included in any location on endpoint 200. Alternatively, 210A-E and the distance sensor 212 could be included in a housing that is positionable above or below a display screen (e.g., the "endpoint" could be a camera/sensor unit).

Figure 3:
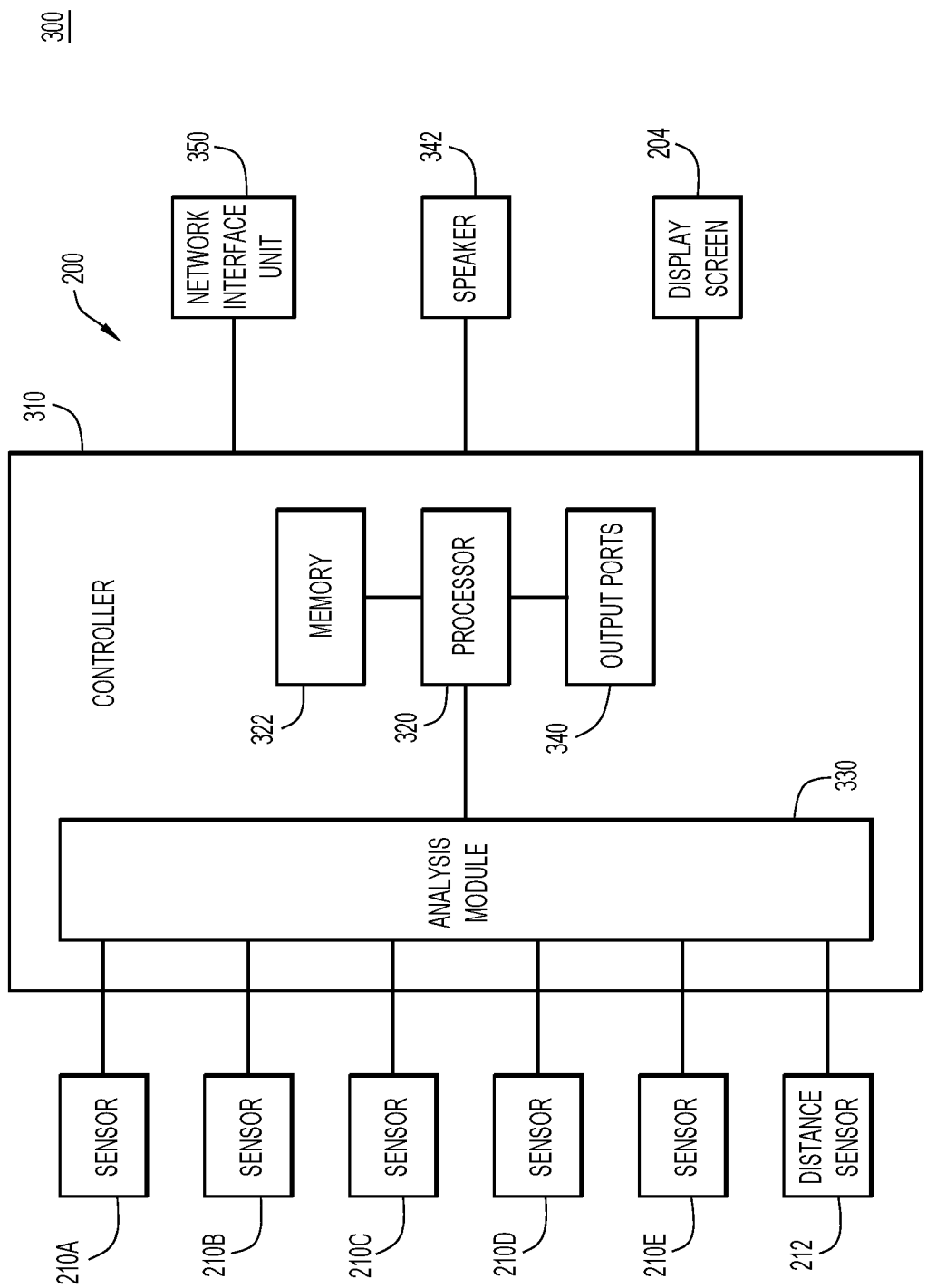
FIG. 3 is a block diagram of the endpoint of FIG. 2, according to an example embodiment.

Now referring to FIG. 3, a block diagram 300 of video conference endpoint 200, configured in accordance with an example embodiment, is shown. Reference is also made to FIGS. 1 and 2 for purposes of the description of FIG. 3. In this particular embodiment, the six sensors included in video conference endpoint 200 (sensors 210A-E and distance sensor 212) are each operatively coupled to a controller 310. The controller 310 includes a processor 320, memory 322, an analysis module 330, and various output ports 340. Additionally, the controller 310 is also operatively coupled to the display screen 204 (which may also be or include sensors), a speaker 342, and a network interface unit 350 that enables network communication.

In one example, the functions of the processor 320 and the analysis module 330 may be implemented by fixed or programmable digital logic gates (e.g., in a programmable gate array). Alternatively, the functions of the controller 310 may be implemented by software stored in a memory 322 (e.g., client framing module 172 of FIG. 1) that, when executed, causes the processor 320 to perform the operations described herein for the controller 310. Put another way, processor 320 may be equivalent to processor 152 of FIG. 1 and memory 322 may be equivalent to memory 156 of FIG. 1. Likewise, network interface unit 350 may be equivalent to network interface unit 154 of FIG. 1. Thus, any description of processor 152, memory 156, and network interface unit 154 included above may apply to processor 320, memory 322, and network interface unit 350, respectively. For example, memory 322 may store instructions that may be executed by processor 320 for performing tasks associated with analyzing sensor input and adjusting framings for video content in the manner described herein.

In some embodiments, the controller 310 may include processing pipelines configured to receive high resolution video signals from one or more image sensors included in sensors 210A-E (e.g., from one or more image sensors 210A) and convert these signals into a video stream to be output to another video conferencing endpoint. The pipelines may also include croppers and scalers that can digitally process video signals provided by the image sensors included in sensors 210A-E (e.g., from one or more image sensors 210A). Additionally or alternatively, the controller 310 may include decoders or coders to facilitate the transmission and receipt of video streams (including participant streams and data streams) during a video conference session. The analysis module 330, based on instructions from the processor 320 (e.g., when executing client framing module 172 of FIG. 1), performs analysis of distance-based data from distance sensor 212 (i.e., distance sensor data) to detect where in an environment people are sitting, moving, standing, and to otherwise detect activity on or proximate display screen 204 of a video conference endpoint 200. Additionally, the analysis module 330 may determine who is speaking to find a presenter/speaker. Still further, the analysis module 330, based on instructions from the processor 320 (e.g., when executing client framing module 172 of FIG. 1), may compose framings for a video stream and determine when new framings are needed and/or when a current framing has a potential error, as is described in further detail below.

Figure 4:
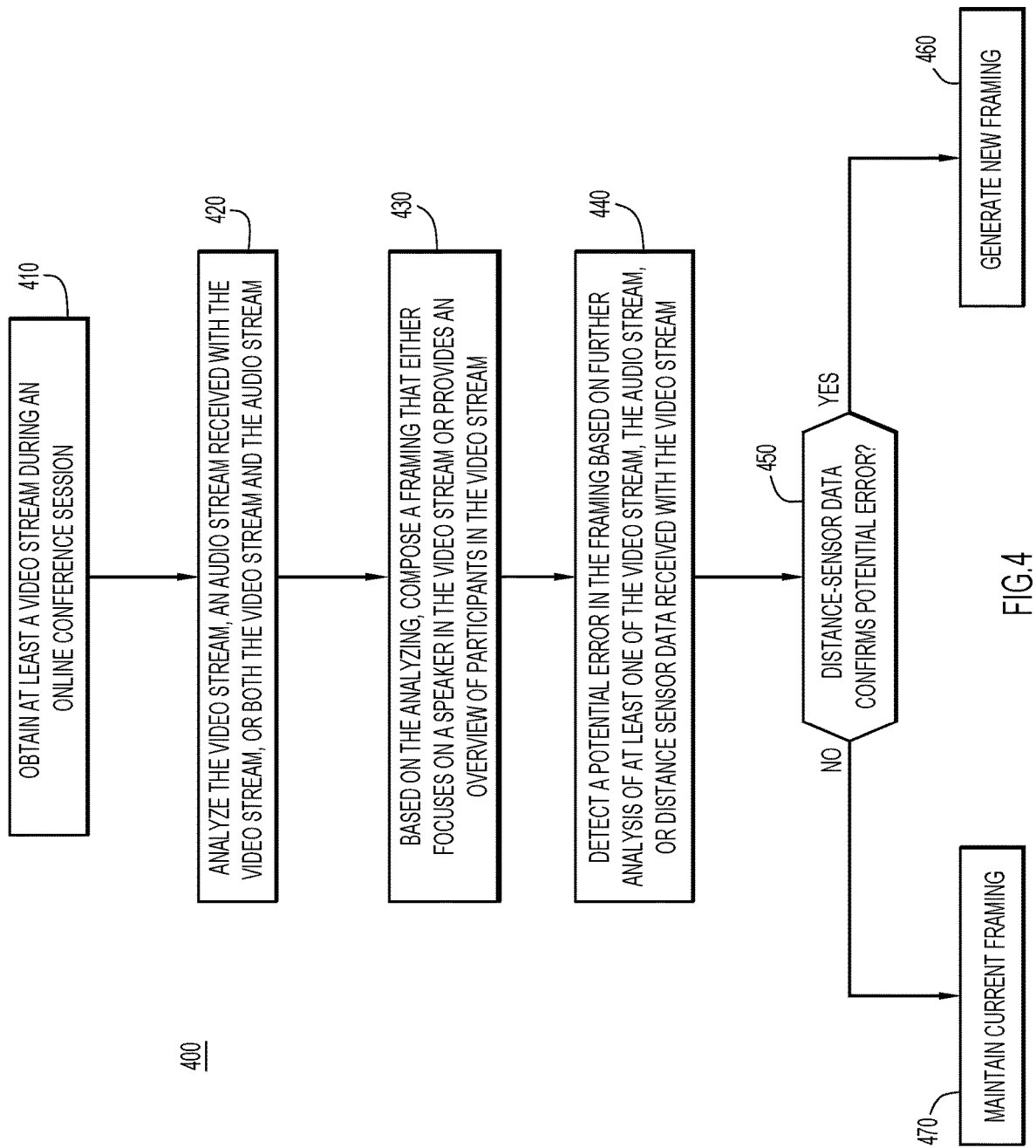
FIG. 4 is a high-level flowchart depicting operations of the distance-based framing techniques presented herein, according to an example embodiment.

Reference is now made to FIG. 4, with reference to FIG. 1-3, for a high-level description of a method 400 for distance-based framing during an online conference session. For simplicity, method 400 is described herein as being performed by an endpoint or components thereof, such as via execution of the software instructions included in client framing module 172 by endpoint 120, endpoint 200 or components thereof. However, this is just an example and in other embodiments, the techniques presented herein, or at least portions thereof, may be executed at any computing device participating in an online conference session, including an online conference server 102 serving conference session support.

In method 400, an endpoint initially obtains, at 410, at least a video stream during an online conference session. For example, endpoint 200 may obtain video data from one or more image sensors and processor 320 and/or analysis module 330 may generate a video stream from this video data. At 420, the endpoint analyzes the video stream, an audio stream also obtained at that endpoint (e.g., when processor 320 and/or analysis module 330 generate an audio stream from audio data captured by one or more microphones), or both the video stream and the audio stream. This analysis may identify a "speaker" in the video stream.

However, as used herein, the term "speaker" does not necessarily require that the speaker be continuously talking. Instead, a "speaker" may be the participant who most recently spoke, the participant that is currently speaking, and/or the participant that is the most active participant. An active participant may be identified based on which participant is interacting with a display, such as by pointing to a display, writing on a display, or by touching a display. Regardless, a "speaker" may be identified from audio and/or video data in any manner now known or developed hereafter. For example, a speaker may be identified in video data using facial recognition techniques, head detection techniques, and/or eye detection techniques. Additionally or alternatively, a speaker may be identified with audio captured by multiple microphones and triangulation techniques or any other audio location techniques.

At 430, the endpoint may compose a framing that either focuses on a speaker in the video stream or provides an overview of participants in the video stream. For example, to focus on a speaker, the framing may span a certain distance above, below, and beside a face of the speaker that was detected with facial recognition techniques applied to video data. In some instances, the framing can be a digital framing composed by a processor (e.g., with croppings, digital zoom, etc.), but in other instances, the framing can be generated by changing the pan, tilt, zoom, or focus of an image sensor (e.g., a lens of a camera). Still further, a combination of these techniques might be utilized. Meanwhile, an overview of participants may be provided by locating participants and generating a framing in that captures as many and/or as much of the participants as possible. For example, a camera's widest-angle lens may be used to capture a wide area with as many participants as possible and/or a camera may be panned, tilted, and/or zoomed (mechanically or digitally) to capture as many participants as possible. However, generally, the framing or framings composed at 430 can be composed in any manner for selecting at least a portion of a video stream now known or developed hereafter.

At 440, the endpoint detects a potential error in the framing. The endpoint detects this potential error based on a further analysis of any one of or any combination of the video stream, the audio stream, and distance sensor data received with the video stream (and/or with the audio stream). A potential error will indicate that the framing is potentially incorrect. The endpoint may detect a potential error when there is a mismatch between different types of data and/or when analysis of a specific type of data indicates an error or small amount of certainty. For example, if facial detection, head detection, and/or eye detection is performed on video data and is/are failing and/or indicating a low degree of confidence/certainty, this may be considered a potential error. Likewise, if speaker location techniques performed on audio data are failing and/or indicating a low degree of confidence/certainty, this may be considered a potential error. The techniques may also detect a potential error when it determines that an overview framing is not capturing all participants and/or capturing too much space around all of the participants. Still further, if distance sensor data indicates that there is a high degree of movement in the endpoint's environment and/or that participants have moved too close to the endpoint, this may also be considered a potential error.

Any combination of these evaluations could also be used to detect a potential error, which might allow lower thresholds to be used to analyze specific data. For example, if the endpoint detects a moderate amount of movement based on analysis of distance sensor data, but also determines that facial detection has a limited amount of confidence, this combination of data may be considered a potential error. Still further, if different types of data provide different information (i.e., mismatch), this may be considered a potential error. For example, if facial detection indicates a speaker is in one location and audio analysis indicates a speaker is in a different location, this may be considered a potential error.

However, the techniques presented herein do not automatically alter the framing when a potential error is detected. Instead, at 450, the endpoint attempts to confirm the potential error with distance sensor data. More specifically, at 450, the endpoint may analyze distance sensor data to determine how much movement is occurring in the environment of the endpoint, whether the speaker is moving, and/or where the speaker is located with respect to the endpoint. If one or more of these analyses confirms the potential error, the endpoint will, at 460, generate a new framing. If, instead, these analyses do not confirm the potential error-that is, if one or more of these analyses contradicts the potential error-then the endpoint will, at 470, maintain its current framing. As an example, if a potential error is detected because facial recognition has failed, the endpoint may analyze the distance sensor data to determine whether the speaker has moved. If the speaker has not moved, this may indicate the speaker has turned his head and contradicts the error. Audio data might also be analyzed to confirm the speaker is still speaking in the same location and further support the analysis of the distance sensor data. If, instead, facial detection has failed and the distance sensor data indicates that the speaker has moved and/or that there is a high amount of motion in the environment, this may confirm the potential error and a new framing may be generated. The new framing may provide an overview, or a new overview if the initial framing was an overview, of the environment to ensure that a moving speaker, or many moving participants are captured in the video stream.

By comparison, in online conference systems that utilize conventional framing algorithms, potential errors may lead to an automatic change in framing. For example, if facial detection fails or provides a low indication of confidence, conventional framing algorithms may automatically switch the framing to an overview of the endpoint's environment. Unfortunately, this may switch the framing unnecessarily and/or too often. For example, if a speaker looks away from the endpoint while continuing to talk, switching the framing away from the speaker may be distracting and unnecessary. Advantageously, confirming potential errors at 450 with at least distance sensor data may avoid unnecessarily reframing the video stream. This may reduce the amount of processing operations during an online conference session and also improve the meeting experience (by reducing or eliminating continuous reframing). Moreover, confirming potential errors may ensure that the video stream is reframed when necessary. In at least some embodiments, the sensitivity of potential errors can be adjusted, e.g., dynamically and/or via user inputs, to strike a balance between minimizing reframings and identifying a maximum number of errors.

Figure 5:
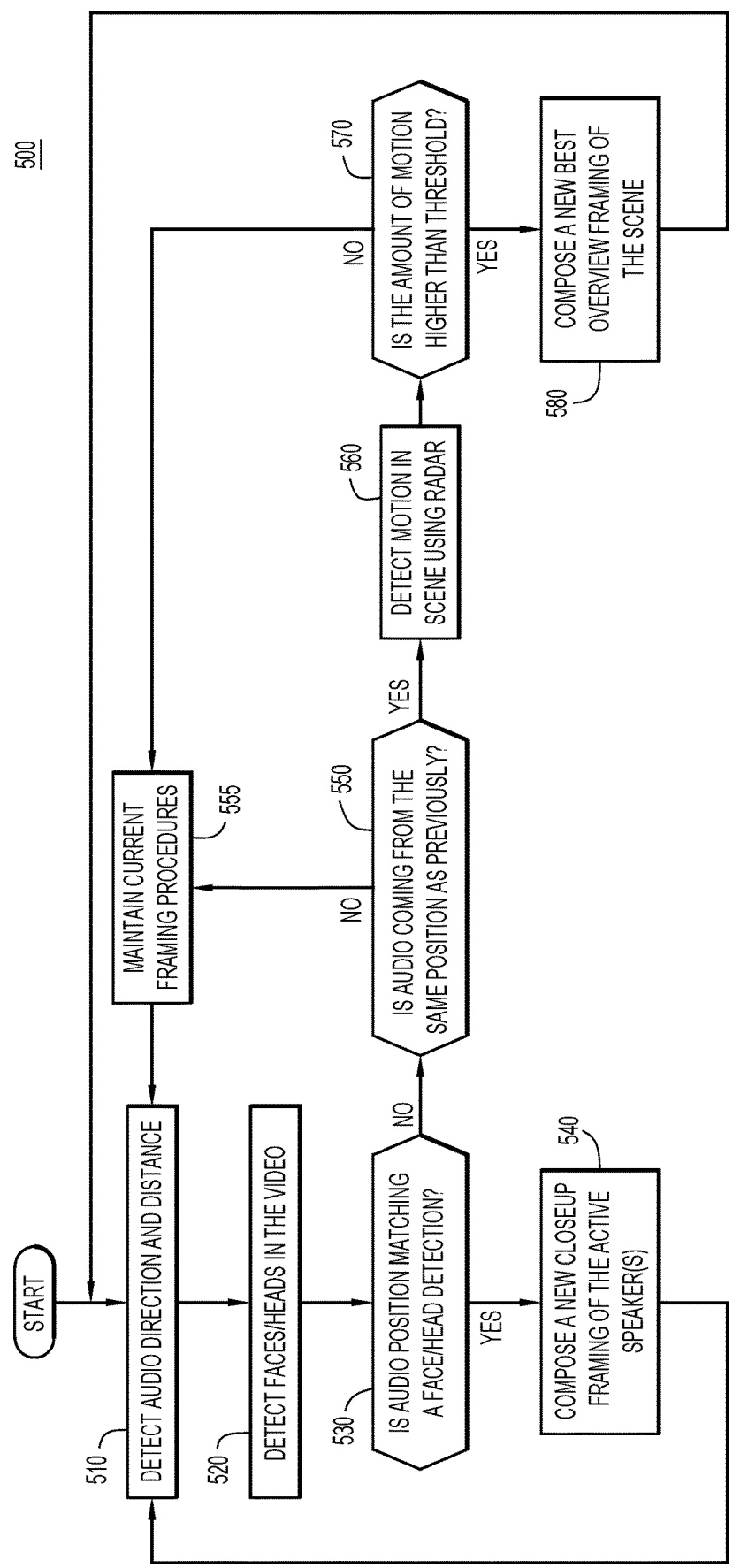
FIG. 5 is a flowchart depicting operations of the distance-based framing techniques presented herein for a first use case, according to an example embodiment.

Reference is now made to FIG. 5. FIG. 5 illustrates a flowchart of a method 500 executed by the distance-based framing techniques presented herein, for a first use case. This particular method is specifically tuned to address framing issues that often arise when a participant is occluded from an endpoint camera's view or not looking at a camera. Reference is also made to FIG. 4 while describing method 500. Initially, at 510, a direction and distance of a speaker is determined by analyzing audio data obtained at an endpoint. At 520, faces and/or heads are detected in video data obtained in an endpoint to locate a speaker in the video data. Each of these steps may, for example, be performed as part of the analysis performed in step 420 of method 400 (of FIG. 4). At 530, the direction and distance determined at 410 are compared to the face/head position detected at 420 to determine if the data matches. As discussed above, a mismatch may be considered a potential error (as is determined in step 440 of method 400).

If the data matches at 530, the endpoint, at 540, continues to generate a framing for the speaker. This framing may be slightly adjusted as the speaker shifts or otherwise slightly moves. If, instead, the data does not match at 530, the endpoint determines, at 550, if the audio is in the same position as it was previously. This may indicate whether the speaker has changed (e.g., if a different participant is now talking) or if the speaker has moved. If the audio is still in the same location, this may cause the endpoint to determine that no potential error exists and the endpoint may, at 555, continue to track speakers and generate framings based on current framing procedures (e.g., based on audio analysis and/or video analysis). For example, if the speaker has not changed, the data may be mismatched because the speaker is now occluded from a camera's field of view and, thus, a new framing may not be appropriate.

However, if the audio is determined to be emanating from a new location, the endpoint may, at 560, evaluate distance sensor data (e.g., radar data), to determine how much motion is occurring in the room. Notably, if the audio is determined to be emanating from a new location, this does not necessarily mean the speaker has moved within the environment. Instead, the speaker might have turned his or her head (e.g., to look at someone entering a conference room), causing audio detection techniques to locate the source of the audio in a different location. Thus, distance sensor data is used to provide further context. The operations of steps 570, 580, and 555 may, for example, correspond to operations performed in steps 450, 460, and 470 of method 400 (of FIG. 4), respectively.

If the amount of motion is determined, at 570, to be higher than a threshold, this may indicate that the speaker and/or other participants is/are moving in the room and, thus, speaker tracking framings, which are typically only optimized for a small amount of speaker movement may be suboptimal. Thus, a new overview framing (e.g., a wide-angle view of the environment) that attempts to capture all participants in the environment may be composed and applied to the video stream at 580. If, instead, the amount of motion is determined, at 570, to be lower than the threshold, the endpoint may, at 555, continue to track speakers and generate framings based on current framing procedures (e.g., based on audio and/or video analysis). This is because a lower amount of movement may indicate that the speaker has not moved and is, instead, occluded or facing a new direction (perhaps only temporarily).

Notably, overall, method 500 processes distance sensor data once audio and/or video analysis identify an error, which reduces processing as compared to techniques that must constantly evaluate distance sensor data. Moreover, method 500 maintains its current framings unless: (1) video and audio data analyses produce mismatched results (e.g., as determined at 530); (2) the audio source has been determined to have moved; and (3) distance sensor data indicates an amount of motion above a threshold. Thus, method 500 reduces or eliminates unnecessary reframing that might occur when a user is occluded or not facing a camera. Still further, since method 500 deactivates speaker tracking framings in favor of a new, best overview when motion in the environment is above a threshold, method 500 may ensure that the best overview is consistently updated when participants are moving or relocating in an environment. This may help avoid using overview framings that do not capture participants who have moved while another participant was speaking.

Figure 6:
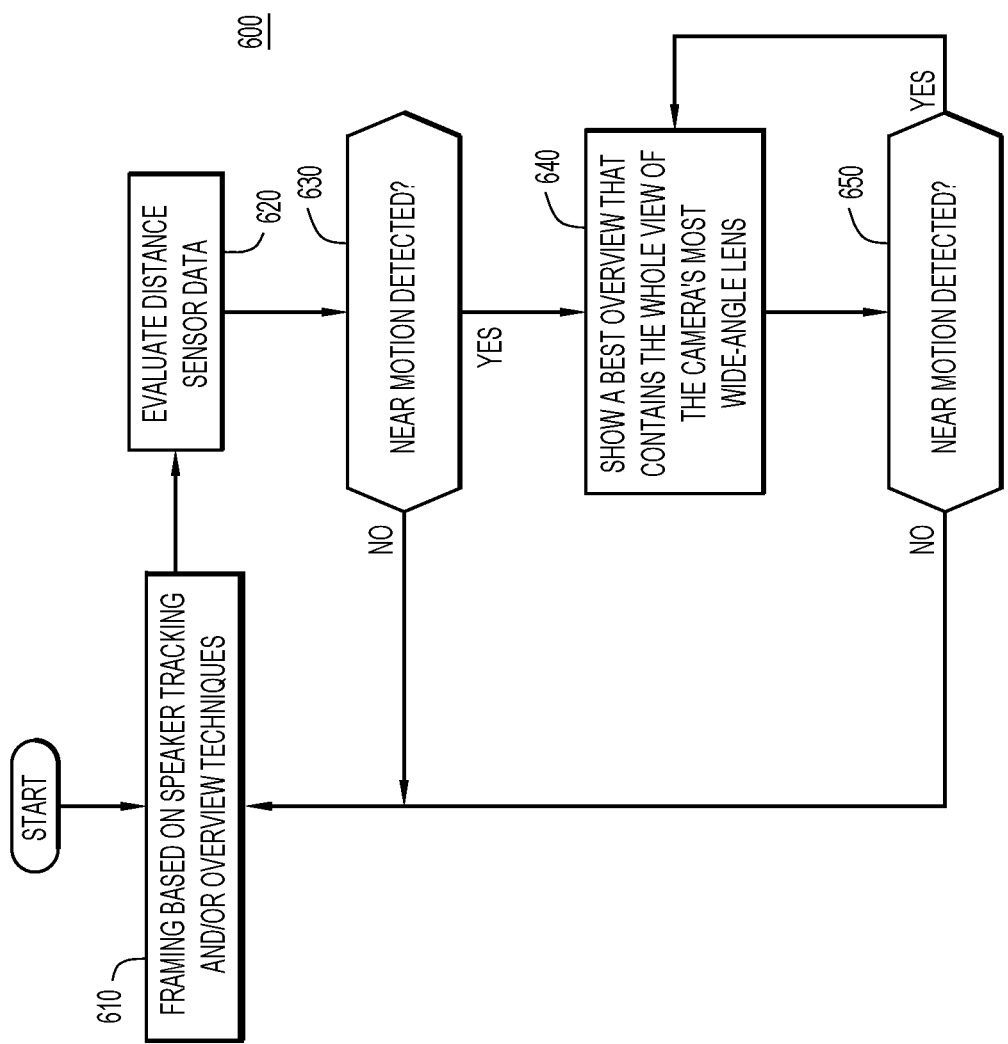
FIG. 6 is a flowchart depicting operations of the distance-based framing techniques presented herein for a second use case, according to an example embodiment.

Reference is now made to FIG. 6. FIG. 6 illustrates a flowchart of a method 600 executed by the distance-based framing techniques presented herein in a second use case. This particular method is specifically tuned to address framing issues that often arise when participants are disposed at edges of an endpoint camera's field of view, such as while interacting with a display. Reference is also made to FIG. 4 while describing method 600. Initially, at 610, the endpoint generates framings based on speaker tracking techniques, such as the example head, face, or eye techniques mentioned above, and/or overview techniques that attempt to capture all participants in an endpoint's environment. However, in this implementation, the endpoint also, at 620, continually evaluates distance sensor data to detect motion near the endpoint (i.e., "near motion"). These two steps may, for example, be performed as part of the analysis performed in step 420 of method 400 (of FIG. 4).

If, at 630, no near motion is detected, the endpoint may continue, at 610, to generate framings based on speaker tracking techniques. Alternatively, if at 630, near motion is detected, the endpoint will, at 640, generate and apply a best overview (or new best overview) framing, which may contain the entire field of view of the camera. Thus, in this implementation, near motion may help an endpoint detect a potential error (e.g., at step 440 of method 400) and may also confirm the potential error (e.g., at step 450 of method 400). That is, in this implementation, near motion may be a self-confirming potential error. Advantageously, this may ensure that a participant positioned adjacent to the endpoint will not be ignored and omitted from the best overview (or new best overview) framing when his or her head/face/eyes are out of the field of view of the camera. This is advantageous because a participant standing adjacent an endpoint is often presenting (e.g., pointing to a slide show), writing on a display, or otherwise interacting with the display of the endpoint and, thus, is often the focal point of a meeting. Consequently, at least some of this participant (e.g., his or her hand) should be included in an overview (or new overview) framing, even if his or her head/face/eyes are not able to be captured in the camera's field of view. For example, it may be important to show this participant's hand writing on a display or pointing to a display even if this participant's head/face/eyes are out of the camera's field of view.

After generating and applying a best overview framing at 640, the endpoint will continue to evaluate near motion at 650. However, at 650, the endpoint may utilize a different threshold as compared to 630. For example, the endpoint may use a larger threshold at 650 than is used at 630. As a more specific example, at 630, the endpoint may determine near motion is detected when a participant is within 1 meter of the endpoint (as determined based on distance sensor data). Then, at 650, the endpoint may determine there is no near motion when the distance sensor does not detect motion within, for example, 1.3 meters of the endpoint. These different thresholds are just examples, but overall, different thresholds will create hysteresis to avoid rapid switches between regular speaker tracking and a best overview framing (which contains the whole view of the camera's widest-angle lens). The thresholds can be determined dynamically based on historical patterns, current movement patterns, or can be based on predetermined distances (e.g., experimentally determined distances).

Moreover, although steps 630 and 650 discuss "near motion," method 600 could, in at least some embodiments, detect peripheral motion at steps 630 and 650, insofar as "peripheral motion" may indicate motion towards a boundary of a camera's field of view. Peripheral motion could be detected in addition to, or as an alternative to, near motion in order to attempt to capture at least a portion of participants that are partially outside of the camera's field of view in an endpoint's video stream.

Still referring to FIG. 6, but with reference to FIG. 5, in some embodiments, method 600 and method 500 could be combined. For example, an endpoint might allow a user to toggle between an "occluded participant mode" where the endpoint executes method 500 and a "near motion participant mode" where the endpoint executes method 600. Alternatively, an endpoint might dynamically switch between these two modes/methods. For example, method 500 and/or method 600 could be triggered in response to different triggers, such as constant motion, peripheral motion, near end motion, continuous audio-video mismatches, etc.

Reference is now made to FIG. 7. FIG. 7 illustrates an example motion detection plot 700 that can be utilized to analyze distance sensor data (e.g., radar data). As mentioned, in at least some embodiments, the distance sensor may be a radar sensor that receives five motion detections per second. Additionally or alternatively, the distance sensor may be any other distance sensor operating at any other frequency. In any case, once motion detections are received, the motion detections can plotted onto a plot 700 of an endpoint's environment 710. In FIG. 7, the environment 710 is illustrated schematically as a conference room with a table. An endpoint (not shown) is positioned adjacent to one end of the table so that its distance sensor 712 faces the table. Thus, the field of view of the distance sensor 712 spans over most of the table and over an angular swath of the environment 710.

In environment 710, the plot 700 is an angular mapping 720. The mapping 720 includes radial columns, represented as 720A, 720B, and 720C, and each of these columns is broken into segments at different distances from the distance sensor 712. As an example, the segments of column 720A are labelled as segments 720A-1, 720A-2, 720A-3, and 720A-4. With such a mapping (or any variation thereof), distance sensor data (e.g., motion detections) can be plotted over time to provide indications of movement or motion. The endpoint can track how many detections have been recorded in each segment (i.e., each cell) and, then, motion rates can be determined based on the number of detections in a cell (or in the plot) over the past X number of seconds. Notably, plot 700 of FIG. 7 is only provided as an example and is not to be at scale. As example dimensions, angular columns (represented schematically as columns 720A-C) might be each span 10 degrees and the segments of each column (e.g., segments 720A-1 to 720A-4) may be 50 centimeters deep.

To summarize, in one form, a method is provided comprising: obtaining at least a video stream during an online conference session; analyzing the video stream, an audio stream received with the video stream, or both the video stream and the audio stream; based on the analyzing, composing a framing that either focuses on a speaker in the video stream or provides an overview of participants in the video stream, the framing being; detecting a potential error in the framing based on further analysis of at least one of the video stream, the audio stream, or distance sensor data received with the video stream; maintaining the framing if the distance sensor data contradicts the potential error; and generating a new framing if the distance sensor data confirms the potential error.

In another form, an apparatus is provided comprising: a network interface configured to provide network connectivity; a camera configured to capture video in an environment of the apparatus; one or more microphones configured to capture audio in the environment of the apparatus; a distance sensor configured to capture data representative of participant locations in the environment of the apparatus; a processor coupled to the network interface, the camera, the one or more microphones, and the distance sensor, the processor that: obtains video captured by the camera; analyzes the video, audio captured by the one or more microphones, or both the video and the audio; composes a framing that either focuses on a speaker in the video or provides an overview of participants in the video stream, the framing being, the framing being based on analysis of the video, the audio, or both the video and the audio; detects a potential error in the framing based on further analysis of at least one of the video, the audio, or distance sensor data received from the distance sensor; maintains the framing if the distance sensor data contradicts the potential error; and generates a new framing if the distance sensor data confirms the potential error.

In yet another form, a non-transitory computer-readable storage media is provided that is encoded with software comprising computer executable instructions and when the software is executed operable to: obtain at least a video stream during an online conference session; analyze the video stream, an audio stream received with the video stream, or both the video stream and the audio stream; compose a framing that either focuses on a speaker in the video stream or provides an overview of participants in the video stream, the framing being, the framing being based on analysis of the video stream, the audio stream, or both the video stream and the audio stream; detect a potential error in the framing based on further analysis of at least one of the video stream, the audio stream, or distance sensor data received with the video stream; maintain the framing if the distance sensor data contradicts the potential error; and generate a new framing if the distance sensor data confirms the potential error.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

It is also to be understood that the term "approximately" and terms of its family (such as "approximate," etc.) should be understood as indicating values very near to those that accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially." Additionally, terms such as "transmit" and "receive" are broadly used herein to refer to techniques for providing and obtaining data in network environments. For example, data may be provided and obtained through packets transmitted and received through a network (e.g., Internet 110 of FIG. 1), but may also be provided and obtained through data communicated via out-of-band signaling or control channels used in computing environment 100.

What is claimed is:

1. A method comprising:
    obtaining a video stream and an audio stream associated with one or more participants in a room, the one or more participants participating in an online conference session;
    composing a framing that focuses on a speaker of the one or more participants based on analyzing the video stream and the audio stream to identify that audio is emanating from a first location associated with a face or head of one of the one or more participants;
    detecting a potential error in the framing based on determining that the audio is emanating from a location other than the first location;
    determining whether the potential error is an error by determining an amount of motion in the room in response to the determining that the audio of the speaker is emanating from a location other than the first location;
    when the amount of motion is lower than a threshold:
        contradicting that the potential error is an error, and
        maintaining the framing based on the contradicting that the potential error is an error; and
    when the amount of motion is higher than the threshold:
        confirming that the potential error is an error, and
        composing a different framing based on the confirming that the potential error is an error.

2. The method of claim 1, wherein determining the amount of motion in the room comprises evaluating distance sensor data to determine the amount of motion in the room.

3. The method of claim 2, wherein the distance sensor data is radar data.

4. The method of claim 2, wherein evaluating the distance sensor data comprises:
    plotting the distance sensor data onto an angular mapping over time to provide indications of motion.

5. The method of claim 1, wherein the different framing includes an overview framing of the one or more participants in the room.

6. The method of claim 1, further comprising:
    adjusting the framing when the speaker shifts or moves position.

7. The method of claim 1, wherein analyzing the video stream and the audio stream comprises:
    analyzing the audio stream to determine a direction and a distance of the speaker; and
    detecting faces or heads in the video stream to locate the speaker in the video stream.

8. An apparatus comprising:
    a network interface configured to provide network connectivity;
    a camera configured to capture video in an environment of the apparatus;
    one or more microphones configured to capture audio in the environment of the apparatus; and
    a processor coupled to the network interface, the camera, and the one or more microphones, the processor performing operations comprising:
        obtaining a video stream and an audio stream associated with one or more participants in a room, the one or more participants participating in an online conference session;
        composing a framing that focuses on a speaker of the one or more participants based on analyzing the video stream and the audio stream to identify that audio is emanating from a first location associated with a face or head of one of the one or more participants;
        detecting a potential error in the framing based on determining that the audio is emanating from a location other than the first location;
        determining whether the potential error is an error by determining an amount of motion in the room in response to the determining that the audio of the speaker is emanating from a location other than the first location;
        when the amount of motion is lower than a threshold:
            contradicting that the potential error is an error, and
            maintaining the framing based on the contradicting that the potential error is an error; and
        when the amount of motion is higher than the threshold:
            confirming that the potential error is an error, and
            composing a different framing based on the confirming that the potential error is an error.

9. The apparatus of claim 8, wherein, when determining the amount of motion in the room, the processor performs operations comprising evaluating distance sensor data to determine the amount of motion in the room.

10. The apparatus of claim 9, wherein the distance sensor data is radar sensor data.

11. The apparatus of claim 9, wherein, when evaluating the distance sensor data, the processor is further configured to perform operations comprising:
    plotting the distance sensor data onto an angular mapping over time to provide indications of motion.

12. The apparatus of claim 8, wherein the different framing includes an overview framing of the one or more participants in the room.

13. The apparatus of claim 8, wherein the processor is further configured to perform operations comprising:
    adjusting the framing when the speaker shifts or moves position.

14. The apparatus of claim 8, wherein, when analyzing the video stream and the audio stream, the processor is configured to perform operations comprising:
    analyzing the audio stream to determine a direction and a distance of the speaker; and
    detecting faces or heads in the video stream to locate the speaker in the video stream.

15. One or more non-transitory computer-readable storage media encoded with instructions that, when executed by a processor, cause the processor to perform a method comprising:

obtaining a video stream and an audio stream associated with one or more participants in a room, the one or more participants participating in an online conference session;

composing a framing that focuses on a speaker of the one or more participants based on analyzing the video stream and the audio stream to identify that audio is emanating from a first location associated with a face or head of one of the one or more participants;

detecting a potential error in the framing based on determining that the audio is emanating from a location other than the first location;

determining whether the potential error is an error by determining an amount of motion in the room in response to the determining that the audio of the speaker is emanating from a location other than the first location;

when the amount of motion is lower than a threshold:
contradicting that the potential error is an error, and
maintaining the framing based on the contradicting that the potential error is an error; and when the amount of motion is higher than the threshold:
confirming that the potential error is an error, and
composing a different framing based on the confirming that the potential error is an error.

16. The one or more non-transitory computer-readable storage media of claim 15, wherein determining the amount of motion in the room comprises evaluating distance sensor data to determine the amount of motion in the room.

17. The one or more non-transitory computer-readable storage media of claim 16, wherein the distance sensor data is radar data.

18. The one or more non-transitory computer-readable storage media of claim 16, wherein evaluating the distance sensor data comprises:
plotting the distance sensor data onto an angular mapping over time to provide indications of motion.

19. The one or more non-transitory computer-readable storage media of claim 15, wherein the different framing includes an overview framing of the one or more participants in the room.

20. The one or more non-transitory computer-readable storage media of claim 15, the method further comprising:
adjusting the framing when the speaker shifts or moves position.

\* \* \* \* \*